US012624765B2

(12) United States Patent
Ni et al.

(10) Patent No.: US 12,624,765 B2
(45) Date of Patent: May 12, 2026

(54) VALVE CORE

(71) Applicant: CLEMENT INC., Flushing, NY (US)

(72) Inventors: Changzheng Ni, Wuhan (CN);
Chunhua Wang, Wuhan (CN);
Yongqiang Yan, Shanghai (CN)

(73) Assignee: CLEMENT INC., Flushing, NY (US)

( * ) Notice: Subject to any disclaimer, the term of this patent is extended or adjusted under 35 U.S.C. 154(b) by 129 days.

(21) Appl. No.: 18/786,442

(22) Filed: Jul. 27, 2024

(65) Prior Publication Data

US 2026/0029056 A1 Jan. 29, 2026

(30) Foreign Application Priority Data

Jul. 23, 2024 (CN) .......................... 202410992759.6

(51) Int. Cl.
*F16K 11/044* (2006.01)
*B05B 1/18* (2006.01)
*F16K 31/00* (2006.01)

(52) U.S. Cl.
CPC .......... *F16K 11/044* (2013.01); *F16K 31/003* (2013.01); *B05B 1/18* (2013.01)

(58) Field of Classification Search
CPC ............... B05B 1/1618; F16K 11/0445; Y10T 137/2685; Y10T 137/86501; Y10T 137/86879; Y10T 137/87861
See application file for complete search history.

(56) References Cited

U.S. PATENT DOCUMENTS

| | | | | |
|---|---|---|---|---|
| 5,069,241 | A * | 12/1991 | Hochstrasser | ...... F16K 11/0445 137/119.05 |
| 10,232,386 | B1 * | 3/2019 | Lu | ........................ F16K 11/0743 |
| 11,813,621 | B2 * | 11/2023 | Shen | ..................... B05B 1/1672 |
| 2009/0025813 | A1 * | 1/2009 | Cen | ......................... E03C 1/023 137/871 |
| 2010/0257670 | A1 * | 10/2010 | Hodel | .................... B05B 3/049 4/596 |
| 2019/0168238 | A1 * | 6/2019 | Swanson | ................. E03B 1/048 |
| 2024/0418274 | A1 * | 12/2024 | Hu | ........................... F16K 31/44 |

* cited by examiner

*Primary Examiner* — Robert K Arundale

(57) ABSTRACT

A valve core which includes a housing, a valve assembly arranged below the housing, a switching component, a control mechanism, and a marble. The valve assembly is provided with a water inlet, a water crossing port, a first water outlet, and a second water outlet. The switching component is movably arranged at the water inlet or the water crossing port or the second water outlet. An end of the control mechanism passes through a top portion of the housing, and another end thereof is biased against the switching component. Operating the control mechanism, the marble is driven to push the switching component, so that the water inlet is connected to the first water outlet and/or second water outlet to form two water passages. The control mechanism includes a valve stem and a lifting component, and the marble is arranged between the lifting component and the switching component.

10 Claims, 8 Drawing Sheets

1
2
5
50
3

62
66

63
64

65

4
7

70
60
6
61

80
71

81    8

5

2

1

1

2

4

6

8

1

2

VALVE CORE

TECHNICAL FIELD

The present disclosure relates to the field of sanitary ware, in particular to a valve core.

BACKGROUND

Most of the push-button valve cores currently available on the market have some drawbacks. For example, they have a single function and cannot meet changing needs, or they are prone to getting stuck or unsmooth during use, thereby causing poor user experience.

SUMMARY

The present disclosure provides a valve core which can effectively solve the above problems.

The present disclosure adopts the following technical solutions.

A valve core, comprises:

a housing having a hollow cavity;

a valve assembly installed below the housing, wherein the valve assembly is provided with a water inlet, a water crossing port, a first water outlet, and a second water outlet;

a switching component, wherein the switching component extends through the hollow cavity and the valve assembly, and the switching component is movably arranged on the water inlet or the water crossing port or the second water outlet;

a control mechanism arranged in the hollow cavity, wherein a first end of the control mechanism passes through a top portion of the housing and a second end of the control mechanism contacts the switching component; and a marble arranged between the switching component and the control mechanism, wherein the control mechanism is operated to drive the marble to push the switching component, such that the water inlet communicates with the first water outlet and/or the second water outlet;

wherein, the control mechanism comprises a valve stem and a lifting component arranged below the valve stem, the valve stem is provided with N pieces of first fan blades at an end proximal to the lifting component, $N=2n$, wherein n is an integer and $n \geq 1$; the lifting component is provided with K pieces of second fan blades at an end proximal to the valve stem, $K=2$ or $K=2k+1$, wherein k is an integer and $k \geq 1$.

As a further improvement, the first fan blades have an angle of $a°$ and have a height of L1, the second fan blades have an angle of $b°$ and have a height of L2, $a>b$ and $L1<L2$; when the first fan blades contact in place with the second fan blades, an included angle $c°$ is formed between the first fan blades and the second fan blades.

As a further improvement, the marble is configured as a sphere, a gap is formed between the control mechanism and the switching component, and the sphere is arranged inside the control mechanism with an end biased against the switching component.

As a further improvement, the marble is made of stainless steel.

As a further improvement, a first sealing ring is sleeved on the switching component at an end proximal to the valve assembly, an inner dimension of the water inlet is larger than an outer dimension of the first sealing ring, inner dimensions of the water crossing port and the second water outlet are smaller than the outer dimension of the first sealing ring, and the first water outlet communicates with the water crossing port; when the first sealing ring is located at the water crossing port, the water inlet communicates with the second water outlet; when the first sealing ring is located at the second water outlet, the water inlet communicates with the first water outlet via the water crossing port; and when the first sealing ring is located at the water inlet, the water inlet communicates with the first water outlet and the second water outlet at the same time.

As a further improvement, the valve assembly comprises a valve body and a valve seat arranged inside the valve body, the valve body is provided with a cavity extending through from top to bottom, the water inlet and the first water outlet are respectively provided on the sidewall of the cavity and extend through the sidewall of the cavity, the water inlet is arranged below the first water outlet; the valve seat is arranged at a lower end of the cavity, and the sidewall of the valve seat is provided with a water passing port corresponding to the water inlet, the water crossing port and the second water outlet are respectively arranged on an upper end surface and a lower end surface of the valve seat and extend therethrough, and the water crossing port and the second water outlet communicate with the water passing hole; the inner dimension of the water passing port is larger than the outer dimension of the first sealing ring, and the first sealing ring is selectively located at the water crossing port, the second water outlet or the water passing port.

As a further improvement, the valve assembly comprises a valve body, the valve body has a cavity extending through from top to bottom, the water inlet and the first water outlet are respectively arranged on a sidewall of the cavity, the water inlet and the first water outlet extend through the sidewall of the cavity, and the water inlet is arranged below the first water outlet; the water crossing port and the second water outlet are arranged on an axial direction of the valve seat, the water crossing port connects the first water outlet and the water inlet, and the second water outlet is arranged at a lower end of the cavity and extends through a lower surface of the valve body.

As a further improvement, an upper end of the valve body is provided with an accommodation groove, the accommodation groove has an annular shape and is provided on an outer side of an upper end of the cavity; the switching component is movably arranged in the cavity and extends through the cavity, an elastic member is arranged in the accommodation groove, and an end of the elastic member is biased against an upper end surface of the switching component.

As a further improvement, an outer side of the upper end of the valve body is provided with a first connection portion, a lower end of the cavity is provided with a second connection portion, and the first connection portion and the second connection portion are connected to each other.

As a further improvement, an upper end of the hollow cavity is provided with a plurality of fan blade grooves, the number of the fan blade grooves is consistent with the number of the first fan blades, and the first fan blades are respectively accommodated in the fan blade grooves.

The present disclosure has the following advantages: the valve assembly is provided with a water inlet, a first water outlet, and a second water outlet and forms two water passages, by operating the valve stem, the lifting component is driven to push the switching component to clear or block the water passages, and the two water passages may be opened at the same time to discharge water or the two water passages may be opened separately to discharge water independently, so as to meet the user's changing needs. A stainless steel marble is provided between the lifting component and the switching component, so that the lifting component is not in direct contact with the switching component while the stainless steel marble is in direct contact with the switching component. Due to the spherical shape of the stainless steel marble, the contact area between the stainless steel marble and the switching component is relatively small each time the marble is pressed, and the pressing friction can be reduced, so the switching is smoother. For the design of the valve stem and the lifting component, the number of fan blades on the head of the lifting component is reduced and the contact surfaces of the valve stem and the lifting component have an angle difference that can reduce the friction, so as to realize smoother switching.

BRIEF DESCRIPTION OF THE DRAWINGS

In order to more clearly illustrate the technical solutions of the implementations of the present disclosure, the drawings required for the illustration of the implementations will be briefly introduced below. It should be understood that the following drawings only show certain embodiments of the present disclosure and therefore should not be regarded as limiting the scope of the present disclosure. For those of ordinary skill in the art, other related drawings can be derived based on these drawings without paying creative efforts.

Figure 1:
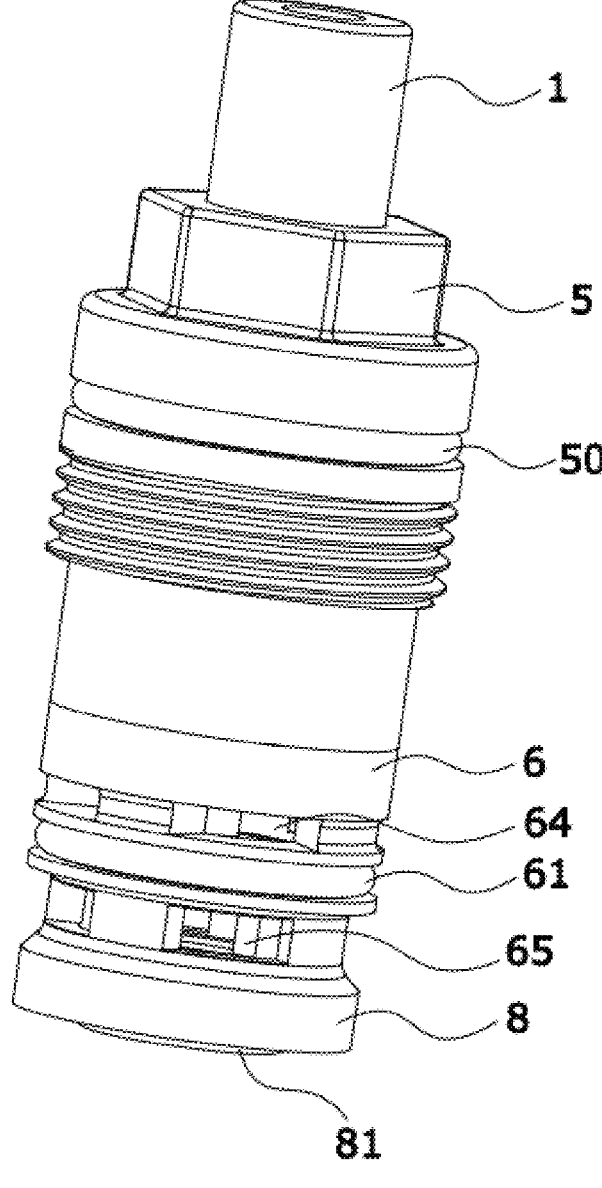
FIG. 1 is an isometric view of an embodiment of the present disclosure.
Figure 2:
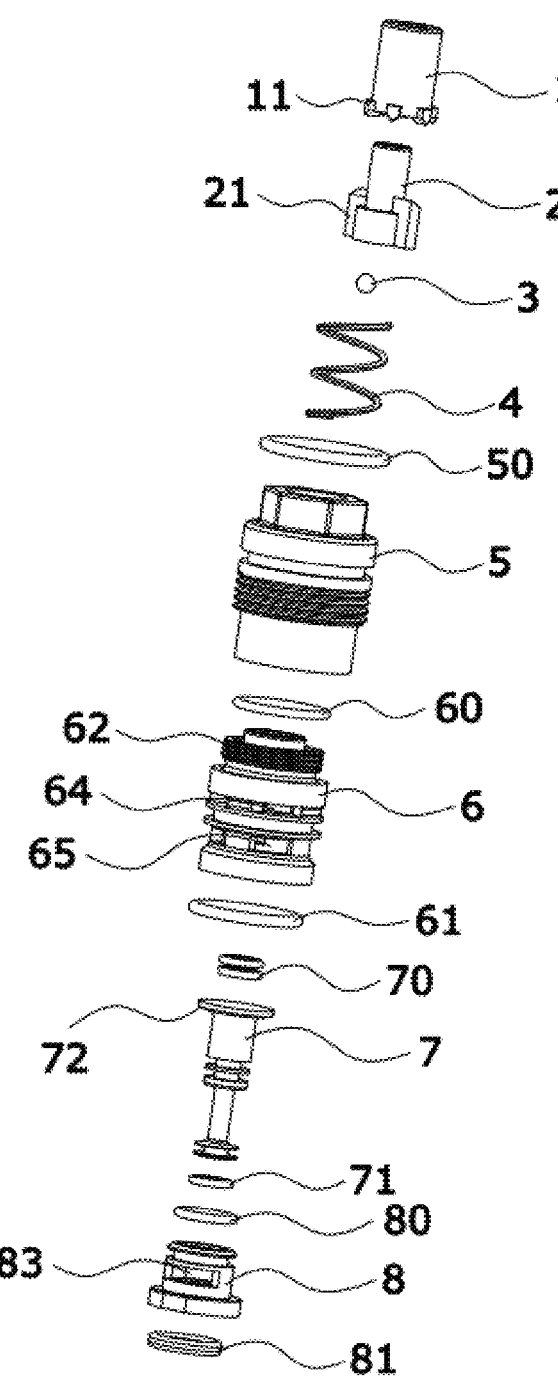
FIG. 2 is an exploded view of an embodiment of the present disclosure.

The reference numerals in the drawings are listed below:
1. valve stem; 11. first fan blade;
2. lifting component; 21. second fan blade;
3. marble;

4. elastic member;
5. housing; 50. seventh sealing ring; 51. hollow cavity; 52. second connection portion; 53. fan blade groove;
6. valve body; 60. third sealing ring; 61. sixth sealing ring; 62. first connection portion; 63. cavity; 64. first water outlet; 65. water inlet; 66. accommodation groove;
7. switching component; 70. second sealing ring; 71. first sealing ring; 72. limiting surface;
8. valve seat; 80. fourth sealing ring; 81. fifth sealing ring; 82. water crossing port; 83. water passing port; 84. second water outlet.

DETAILED DESCRIPTION OF THE EMBODIMENTS

In order to make the objectives, technical solutions and advantages of the embodiments of the present disclosure clearer, the technical solutions in the embodiments of the present disclosure will be clearly and completely described below in conjunction with the drawings in the embodiments of the present disclosure. Obviously, the described embodiments involve part of the embodiments of the present disclosure rather than all. Based on the embodiments of the present disclosure, all other embodiments derived by those of ordinary skill in the art without paying creative efforts should all be considered as falling within the scope of protection of the present disclosure. Therefore, the following detailed illustration of the embodiments of the present disclosure in the drawings is not intended to limit the scope of the present application sought to be patented, but merely represents the selected embodiments of the present disclosure. Based on the embodiments of the present disclosure, all other embodiments obtained by those of ordinary skill in the art without paying creative efforts fall within the scope of protection of the present disclosure.

In the description of the present disclosure, the terms "first" and "second" are used for descriptive purposes only and should not be understood as indicating or implying relative importance or implicitly indicating the number of the indicated technical features. Thus, a feature defined as "first" or "second" may explicitly or implicitly include one or more of the features. In the description of the present disclosure, the meaning of "plurality" is two or more, unless otherwise clearly and specifically defined.

FIGS. 1-13 show a valve core includes a housing 5, a valve assembly arranged below a valve body 6, a switching component 7 extending through an interior of the housing 5, an elastic member 4 sleeved on the switching component 7, and a control mechanism arranged above the housing 5. The control mechanism is biased against an end of the switching component 7, and another end of the switching component 7 is movably arranged in the valve assembly. By operating the control mechanism, the control mechanism pushes the switching component 7 to drive the switching component 7 to block any water outlet on the valve assembly, thereby providing users with a variety of water outlet settings.

The housing 5 has a hollow cavity 51 that extends through from top to bottom, and an inner sidewall of a lower end of the hollow cavity 51 is provided with a second connection portion 52. The valve assembly includes a valve body 6, and an outer side of an upper end of the valve body 6 is provided with a first connection portion 62. A third sealing groove is provided below the first connection portion 62, and a third sealing ring 60 is sleeved on the third sealing groove. The first connection portion 62 is connected to the second connection portion 52, and the valve body 6 is connected and sealed with the housing 5 through the third sealing ring 60. In this embodiment, the first connection portion 62 is configured as an external thread structure, the second connection portion 52 is configured as an internal thread structure, and the internal thread structure and the external thread structure are screwed and fixed to each other.

The valve body 6 is provided with a cavity 63 extending through from top to bottom, the valve assembly further includes a valve seat 8, and the valve seat 8 is arranged at a lower end inside the cavity 63. The valve body 6 has a first water outlet 64 and a water inlet 65. The first water outlet 64 and the water inlet 65 are both arranged on the sidewall of the valve body 6 and connected to the cavity 63. The first water outlet 64 is arranged on the middle part of the sidewall of the valve body 6, and the water inlet 65 is arranged below the first water outlet 64. The valve seat 8 is provided with a water crossing port 82, a water passing port 83, and a second water outlet 84 in the axial direction from top to bottom. The water crossing port 82 extends upward through an upper end surface of the valve seat 8, and the second water outlet 84 extends downward through a lower end surface of the valve seat 8. The water crossing port 82, the water passing port 83 and the second water outlet 84 are interconnected in sequence. The water passing port 83 extends through the sidewall of the valve seat 8 and corresponds to the water inlet 65. The first water outlet 64 is interconnected with the water crossing port 82. The switching component 7 passes through the cavity 63 from the hollow cavity 51 and extends to the valve seat 8. The switching component 7 is movably arranged on the water crossing port 82, the water passing port 83 or the second water outlet 84.

An end of the switching component 7 proximal to the valve seat 8 is provided with a first sealing groove, and a first sealing ring 71 is sleeved on the first sealing groove. The first sealing ring 71 may be placed on the water crossing port 82, the water passing port 83, or the second water outlet 84 as the switching component 7 moves, so as to selectively discharge the water flow from any water outlet. The middle part of the switching component 7 is provided with two second sealing grooves, and second sealing rings 70 are sleeved on the second sealing grooves. The outer diameter of the second sealing ring 70 is larger than the inner diameter of the cavity 63, and the second sealing rings 70 match with the wall surface of the cavity 63 to seal the cavity 63, so that the water flow cannot leak out from the upper end of the cavity 63.

Figure 3:
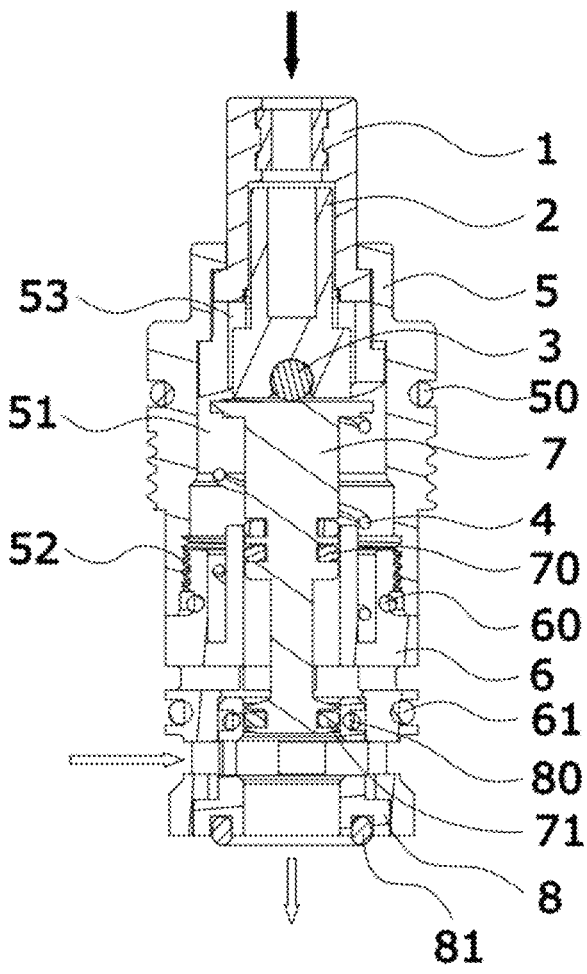
FIG. 3 is a first structural cross-sectional view of an embodiment of the present disclosure showing the first water outlet state.
Figure 5:
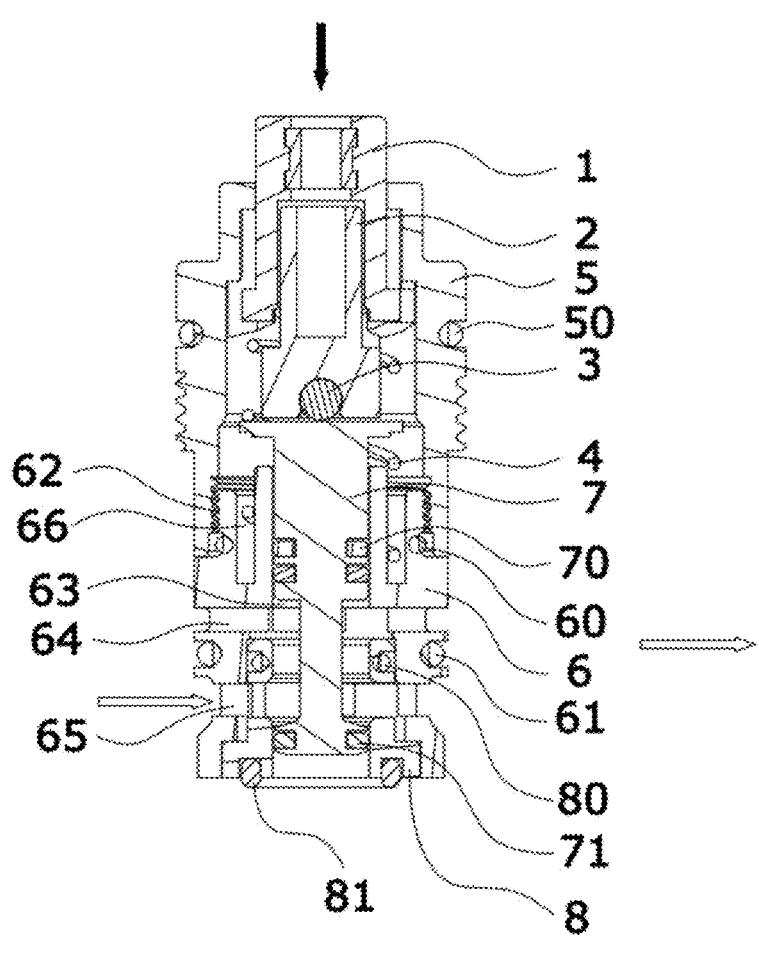
FIG. 5 is a first structural cross-sectional view of an embodiment of the present disclosure showing the second water outlet state.
Figure 7:
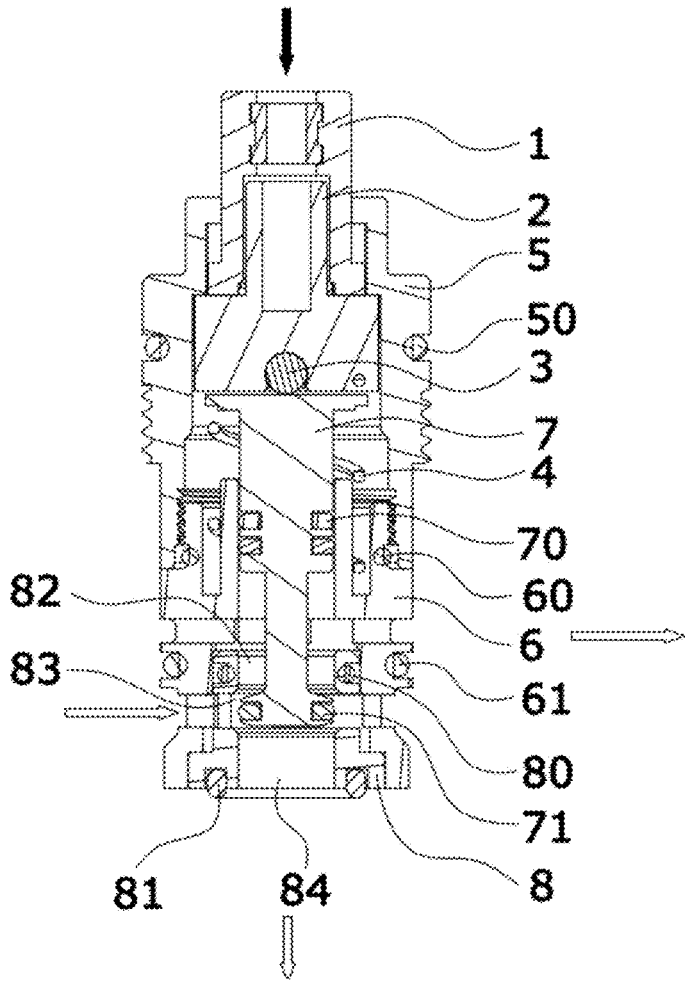
FIG. 7 is a first structural cross-sectional view of an embodiment of the present disclosure showing the third water outlet state.

As shown in FIG. 3, FIG. 5 and FIG. 7, the inner dimensions of the water crossing port 82 and the second water outlet 84 are smaller than the outer diameter of the first sealing ring 71, and the inner dimension of the water passing port 83 is larger than the outer diameter of the first sealing ring 71. As shown in FIG. 3, when the first sealing ring 71 is placed on the water crossing port 82 and blocks off the water crossing port 82, the water inlet 65 is interconnected with the second water outlet 84 through the water passing port 83, and water flows in from the water inlet 65 and flows out from the second water outlet 84 for use. As shown in FIG. 5, when the first sealing ring 71 is placed on the second water outlet 84 and blocks off the second water outlet 84, the water inlet 65 is interconnected with the first water outlet 64 through the water passing port 83 and the water crossing port 82, and water flows in from the water inlet 65 and flows out from the first water outlet 64 for use. As shown in FIG. 7, when the first sealing ring 71 is placed on the water passing port 83, the first sealing ring 71 does not block any outlet, the water inlet 65 is interconnected with the first water outlet 64 and the second water outlet 84 at the same time, and water flows in from the water inlet 65 and flows out from the first water outlet 64 and the second water outlet 84 for use.

A fourth sealing ring 80 is sleeved on the sidewall of the valve seat 8 to seal with the inner wall surface of the cavity 63, and a lower end surface of the valve seat 8 is provided with a fifth sealing ring 81 so as to seal the valve core with the external component. An outer sidewall surface of the valve body 6 is provided with a sixth sealing ring 61 to seal the valve core with the external component. In addition, an outer wall surface of the housing 5 is provided with a seventh sealing ring 50 and an external thread structure to seal and connect with the external component.

In other embodiments, the water crossing port 82 and the second water outlet 84 may be directly arranged on the valve body 6 and the valve seat 8 may be canceled, as long as it can be ensured that the water inlet 65 may be selectively connected to the first water outlet 64 and the second water outlet 84. In this condition, the fourth sealing ring 80 is not required anymore, and the fifth sealing ring 81 may be arranged on the lower end surface of the valve seat 8. Related structures should all be considered as falling within the protection scope of the present disclosure.

In order to enable the switching component 7 to move and select different water outlets for water discharge, the control mechanism is arranged above the switching component 7 to control the movement of the switching component 7 by pressing. The control mechanism is arranged in the hollow cavity 51, an end of the control mechanism passes through the top portion of the housing 5 and another end of the control mechanism is biased against the switching component 7.

Figure 4:
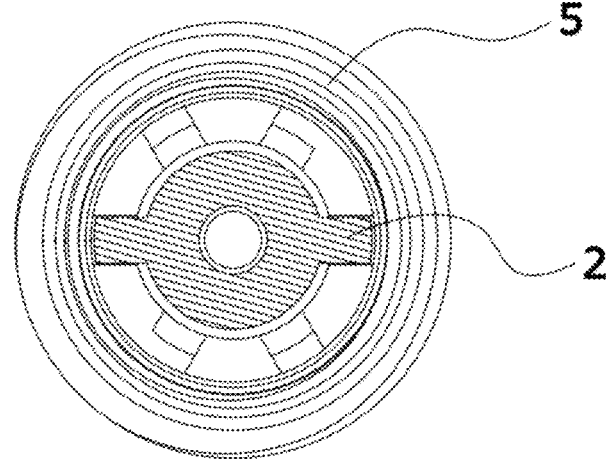
FIG. 4 is a second structural cross-sectional view of the embodiment of the present disclosure under the first water outlet state.
Figure 6:
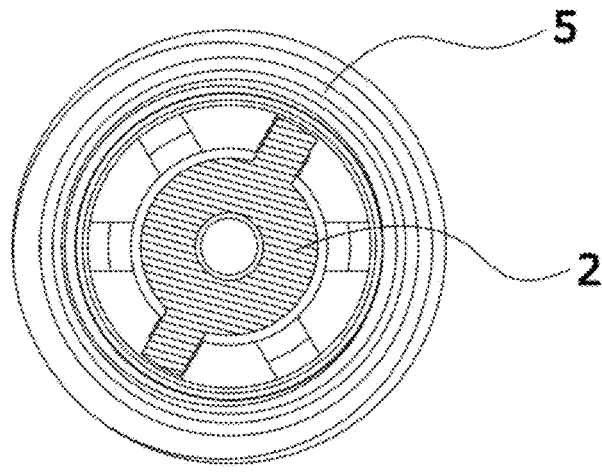
FIG. 6 is a second structural cross-sectional view of the embodiment of the present disclosure in the second water outlet state.
Figure 8:
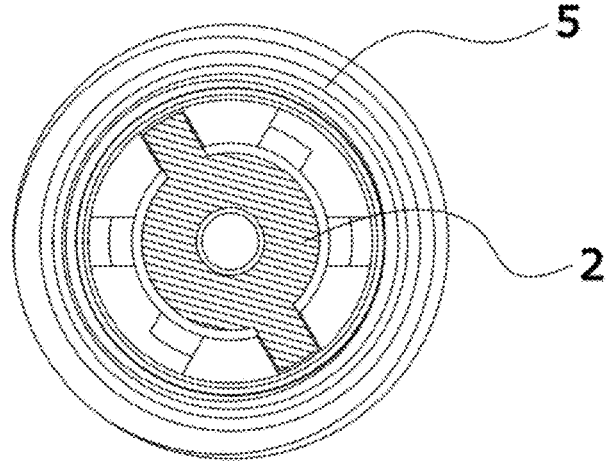
FIG. 8 is a second structural cross-sectional view of the embodiment of the present disclosure under the third water outlet state.
Figure 9:
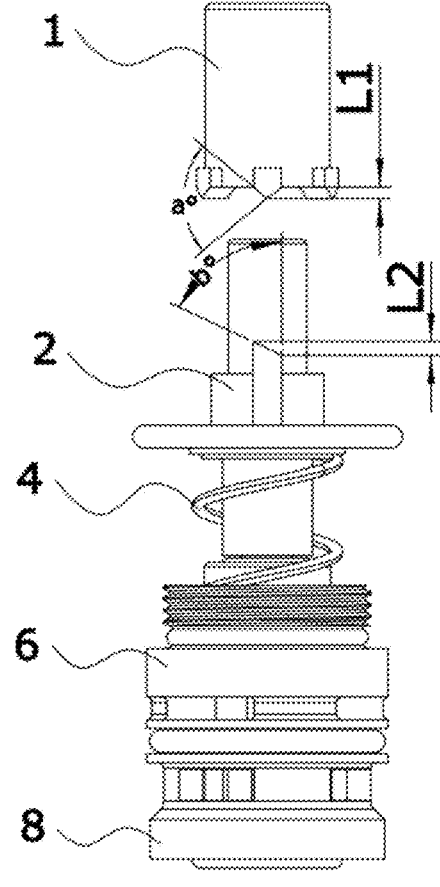
FIG. 9 is a partial exploded view of an embodiment of the present disclosure.
Figure 10:
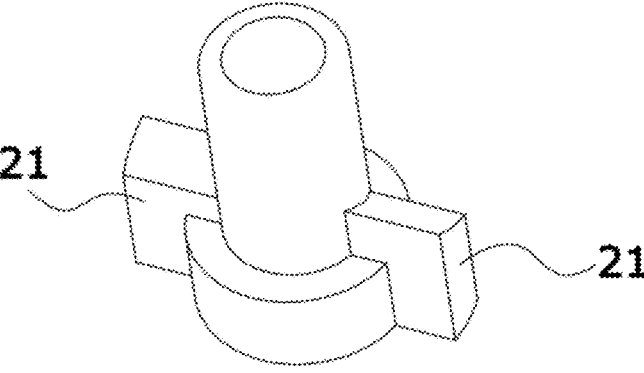
FIG. 10 is an isometric view of a lifting head according to an embodiment of the present disclosure.
Figure 11:
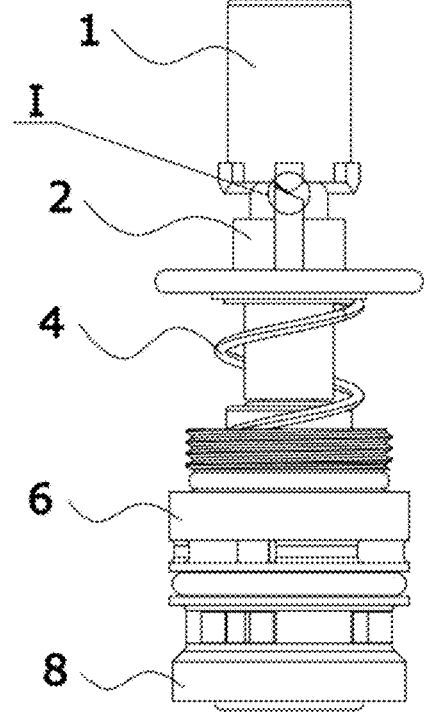
FIG. 11 is a partial front view of an embodiment of the present disclosure.
Figure 12:
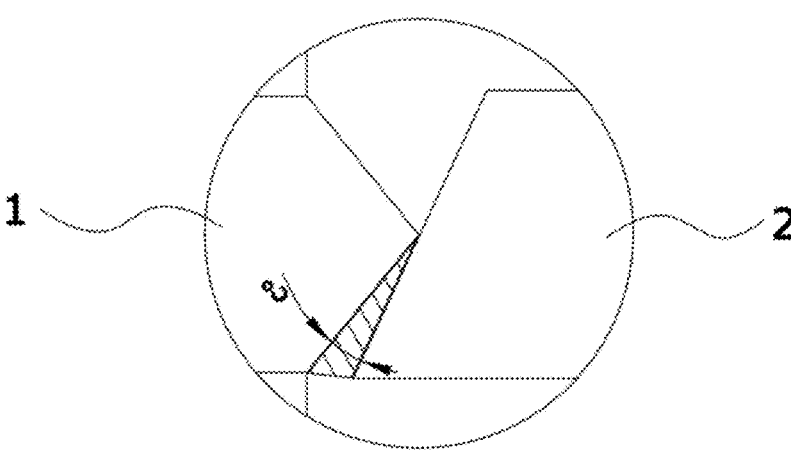
FIG. 12 is a partial enlarged view of an embodiment of the present disclosure.
Figure 13:
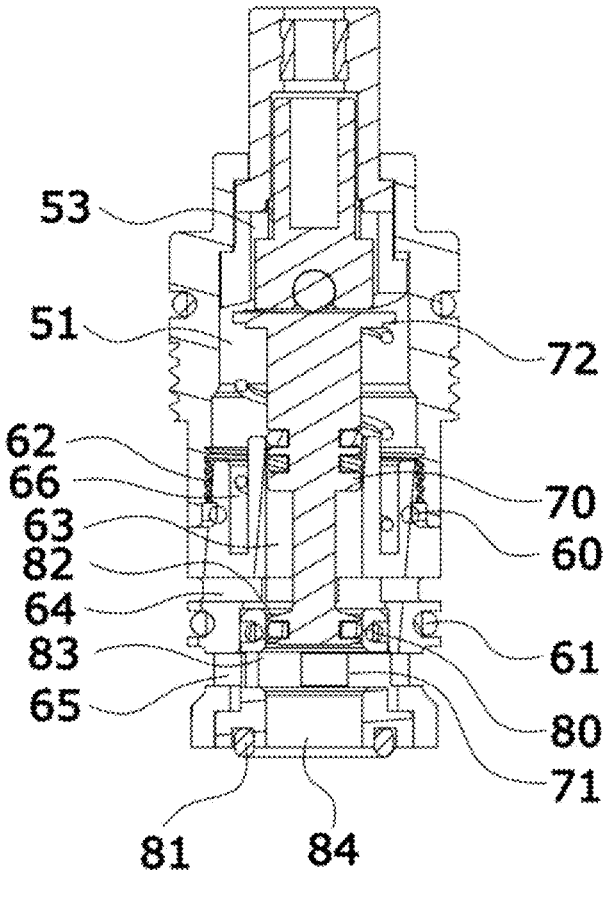
FIG. 13 is a structural cross-sectional view of an embodiment of the present disclosure.

Referring to FIG. 9 and FIG. 10, the control mechanism includes a valve stem 1 and a lifting component 2 arranged below the valve stem 1. An end of the valve stem 1 proximal to the lifting component 2 is provided with a plurality of first fan blades 11, and an end of the lifting component 2 proximal to the valve stem 1 is provided with a plurality of second fan blades 21. An upper end of the hollow cavity 51 is provided with a plurality of fan blade grooves 53, the number of the fan blade grooves is consistent with the number of the first fan blades 11. The first fan blades 11 are accommodated in the fan blade grooves 53, and the first fan blades 11 contact in place with the second fan blades 21. Referring to FIG. 4, the first fan blades 11 are accommodated in the fan blade grooves 53, namely, the second fan blades 21 are located at the position of the first point, and the second fan blades 21 are accommodated in the fan blade grooves 53 and in contact with the first fan blades 11. When the valve stem 1 is pressed downward, as shown in FIG. 6, the first fan blades 11 push the second fan blades 21, and the lifting component 2 rotates counterclockwise along the housing 5 to switch to the position of the second point, namely, the second fan blades 21 leave the current fan blade grooves 53 and enter the fan blade grooves 53 at the position of the second point. When the valve stem 1 is pressed downward again, as shown in FIG. 8, the first fan blades 11 push the second fan blades 21 again, and the lifting component 2 rotates counterclockwise along the housing 5 to switch to the position of the third point, namely, the second fan blades 21 leave the fan blade grooves 53 at the position of the second point and enter the fan blade grooves 53 at the position of the third point.

An end of the valve stem 1 proximal to the lifting component 2 is provided with N pieces of first fan blades 11, N=2n, wherein n is set as an integer and n≥1; an end of the lifting component 2 proximal to the valve stem 1 is provided with K pieces of second fan blades 21, K=2 or K=2k+1, wherein k is set as an integer and k≥1. In order to save labor and facilitate operation when the valve stem 1 pushes the lifting component 2, referring to FIGS. 9-12, in this embodiment, six first fan blades 11 and six fan blade grooves 53 are provided, and two second fan blades 21 are provided, so that the force bearing points during the pressing and switching are reduced to two points. In another embodiment, the number of the second fan blades 21 may only be set as a number that is not divisible by number two, such as 5 fan blades or 7 fan blades, so as to ensure that the force bearing points during the pressing and switching are reduced to two points. Moreover, the angle of the first fan blades 11 is set as d° and the height of the first fan blades is set as L1. The angle of the second fan blades 21 is set as b° and the height of the second fan blades is set as L2, a>b and L1<L2. When the first fan blades 11 contact in place with the second fan blades 21, an angle c° is formed between the first fan blades 11 and the second fan blades 21, such that the position where the force transmits from the valve stem 1 to the lifting component 2 is set as point contact when pressing and switching, thereby reducing the friction between the valve stem 1 and the lifting component 2, and thus enabling effortless pressing. In this embodiment, a° is set as 78°, b° is set as 65°, L1 is set as 1 mm, and L2 is set as 1.2 mm. When switching, only the end point of the included angle of the valve stem 1 is in direct contact with the lifting component 2, thereby reducing the friction between the valve stem 1 and the lifting component 2 during switching, and preventing jamming and unsmooth operation.

Of course, after the valve stem 1 presses the lifting component 2 to push the switching component 7, as the switching component 7 needs to be reset, an elastic member 4 is sleeved on the switching component 7 to push switching component 7 to reset. An end of the switching component 7 away from the valve seat 8 is provided with a limiting surface 72, and an upper end of the valve body 6 is provided with an accommodation groove 66. The accommodation groove 66 is arranged on an outer side of an upper end of the cavity 63 in an annular shape. An end of the elastic member 4 is placed in the accommodation groove 66, and another end of the elastic member 4 is biased against the limiting surface 72. In this embodiment, the elastic member 4 is configured as a spring.

In order to make the switching component 7 smoother during the switching process, a marble 3 is arranged between the switching component 7 and the lifting component 2. A gap is arranged between the lifting component 2 and the switching component 7. An end of the lifting component 2 proximal to the switching component 7 is provided with a spherical cavity. The marble 3 is configured as a sphere and the marble 3 is arranged in the spherical cavity. An end of the sphere extends beyond the lower surface of the lifting component 2. A lower end of the marble 3 is biased against the upper surface of the switching component 7. Since the contact surface between the spherical marble 3 and the switching component 7 is relatively small, the friction between the switching component 7 and the surface of the marble 3 can be reduced during the pressing and switching process, thereby realizing smoother switching. The marble 3 is made of stainless steel to ensure the service life of the marble 3.

The above description merely involves preferred embodiments of the present disclosure and is not intended to limit the present disclosure. For those of ordinary skill in the art, the present disclosure may have various modifications and variations. Any modification, equivalent replacement, improvement, etc. made within the spirit and principle of the present disclosure shall be included in the protection scope of the present disclosure.

What is claimed is:

1. A valve core, comprises:
   a housing having a hollow cavity;
   a valve assembly installed below the housing, wherein the valve assembly is provided with a water inlet, a water crossing port, a first water outlet, and a second water outlet;
   a switching component, wherein the switching component extends through the hollow cavity and the valve assembly, and the switching component is movably arranged on the water inlet or the water crossing port or the second water outlet;
   a control mechanism arranged in the hollow cavity, wherein a first end of the control mechanism passes through a top portion of the housing and a second end of the control mechanism is biased against the switching component; and
   a marble arranged between the switching component and the control mechanism, wherein the control mechanism is operated to drive the marble to push the switching component, such that the water inlet communicates with the first water outlet and/or the second water outlet;
   wherein, the control mechanism comprises a valve stem and a lifting component arranged below the valve stem, the valve stem is provided with N pieces of first fan blades at an end proximal to the lifting component, N=2n, wherein n is an integer and n≥1; the lifting component is provided with K pieces of second fan blades at an end proximal to the valve stem, K=2 or K=2k+1, wherein k is an integer and k≥.

2. The valve core according to claim 1, wherein the first fan blades have an angle of a° and have a height of L1, the second fan blades have an angle of b° and have a height of L2, a>b and L1<L2; when the first fan blades contact the second fan blades, an included angle c° is formed between the first fan blades and the second fan blades.

3. The valve core according to claim 1, wherein the marble is configured as a sphere, a gap is formed between the control mechanism and the switching component, and the sphere is arranged inside the control mechanism with an end biased against the switching component.

4. The valve core according to claim 3, wherein the marble is made of stainless steel.

5. The valve core according to claim 1, wherein a first sealing ring is sleeved on the switching component at an end proximal to the valve assembly, an inner dimension of the water inlet is larger than an outer dimension of the first sealing ring, inner dimensions of the water crossing port and the second water outlet are smaller than the outer dimension of the first sealing ring, and the first water outlet communicates with the water crossing port; when the first sealing ring is located at the water crossing port, the water inlet communicates with the second water outlet; when the first sealing ring is located at the second water outlet, the water inlet communicates with the first water outlet via the water crossing port; and when the first sealing ring is located at the water inlet, the water inlet communicates with the first water outlet and the second water outlet at the same time.

6. The valve core according to claim 5, wherein the valve assembly comprises a valve body and a valve seat arranged inside the valve body, the valve body is provided with a cavity extending through from top to bottom, the water inlet and the first water outlet are respectively provided on a sidewall of the cavity and extend through the sidewall of the cavity, the water inlet is arranged below the first water outlet; the valve seat is arranged at a lower end of the cavity, and the sidewall of the valve seat is provided with a water passing port corresponding to the water inlet, the water crossing port and the second water outlet are respectively arranged on an upper end surface and a lower end surface of the valve seat and extend therethrough, and the water crossing port and the second water outlet communicate with the water passing hole; an inner dimension of the water passing port is larger than an outer dimension of the first sealing ring, and the first sealing ring is selectively located at the water crossing port, the second water outlet or the water passing port.

7. The valve core according to claim 5, wherein the valve assembly comprises a valve body, the valve body has a cavity extending through from top to bottom, the water inlet and the first water outlet are respectively arranged on a sidewall of the cavity, the water inlet and the first water outlet extend through the sidewall of the cavity, and the water inlet is arranged below the first water outlet; the water crossing port and the second water outlet are arranged on an axial direction of the valve seat, the water crossing port connects the first water outlet and the water inlet, and the second water outlet is arranged at a lower end of the cavity and extends through a lower surface of the valve body.

8. The valve core according to claim 6, wherein an upper end of the valve body is provided with an accommodation groove, the accommodation groove has an annular shape and is provided on an outer side of an upper end of the cavity; the switching component is movably arranged in the cavity and extends through the cavity, an elastic member is arranged in the accommodation groove, and an end of the elastic member is biased against an upper end surface of the switching component.

9. The valve core according to claim 1, wherein an outer side of an upper end of the valve body is provided with a first connection portion, a lower end of the cavity is provided with a second connection portion, and the first connection portion and the second connection portion are connected to each other.

10. The valve core according to claim 1, wherein an upper end of the hollow cavity is provided with a plurality of fan blade grooves, the number of the fan blade grooves is consistent with the number of the first fan blades, and the first fan blades are respectively accommodated in the fan blade grooves.

* * * * *